United States Patent
Rafey

(10) Patent No.: US 11,068,328 B1
(45) Date of Patent: Jul. 20, 2021

(54) CONTROLLING OPERATION OF MICROSERVICES UTILIZING ASSOCIATION RULES DETERMINED FROM MICROSERVICES RUNTIME CALL PATTERN DATA

(71) Applicant: Dell Products L.P., Round Rock, TX (US)

(72) Inventor: Mohammad Rafey, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/067,958

(22) Filed: Oct. 12, 2020

(51) Int. Cl.
  *G06F 3/00* (2006.01)
  *G06F 9/54* (2006.01)
  *G06F 9/50* (2006.01)
  *G06F 9/48* (2006.01)

(52) U.S. Cl.
  CPC ............ *G06F 9/547* (2013.01); *G06F 9/4843* (2013.01); *G06F 9/5077* (2013.01); *G06F 9/541* (2013.01)

(58) Field of Classification Search
  CPC ....................................................... G06F 9/541
  USPC ........................................................ 719/318
  See application file for complete search history.

(56) References Cited

U.S. PATENT DOCUMENTS

| | | | | |
|---|---|---|---|---|
| 7,536,693 B1 * | 5/2009 | Manczak | ............... | G06F 3/061 709/226 |
| 7,797,409 B1 * | 9/2010 | Secer | ................. | H04L 43/0817 709/223 |
| 9,747,070 B1 * | 8/2017 | Mutagi | ................. | G06F 3/167 |
| 10,579,370 B2 | 3/2020 | Gupta | | |
| 2007/0005220 A1 * | 1/2007 | Parikh | ................. | G06F 16/957 701/100 |
| 2012/0215911 A1 * | 8/2012 | Raleigh | ................ | H04M 15/66 709/224 |
| 2014/0372986 A1 * | 12/2014 | Levin | ................. | G06F 9/44589 717/126 |

(Continued)

FOREIGN PATENT DOCUMENTS

WO        2017034789 A1     3/2017

OTHER PUBLICATIONS

Long Cheng, Orpheus: Enforcing Cyber-Physical Execution Semantics to Defend Against Data-Oriented Attacks. (Year: 2017).*

(Continued)

*Primary Examiner* — Lechi Truong
(74) *Attorney, Agent, or Firm* — Ryan, Mason & Lewis, LLP

(57) ABSTRACT

An apparatus comprises a processing device configured to obtain runtime call pattern data for microservices in an information technology infrastructure, to generate a model of the runtime call pattern data characterizing transitions between states of the microservices, and to capture point of interest events from the runtime call pattern data utilizing the generated model. The processing device is also configured to determine, for a given sliding window time slot, association rules between the captured point of interest events, a given association rule characterizing a relationship between first and second point of interest events corresponding to first and second state transitions occurring during the given sliding window time slot for first and second ones of the microservices. The processing device is further configured to control operation of the microservices in the information technology infrastructure based at least in part on the determined association rules.

20 Claims, 11 Drawing Sheets

(56) References Cited

U.S. PATENT DOCUMENTS

| | | | |
|---|---|---|---|
| 2016/0057207 A1* | 2/2016 | Li | H04L 67/10 709/203 |
| 2017/0063833 A1 | 3/2017 | Colle et al. | |
| 2019/0103007 A1* | 4/2019 | Tan | A61B 5/1112 |
| 2019/0250912 A1 | 8/2019 | Gavisiddappa Kodigenahalli et al. | |
| 2019/0319868 A1* | 10/2019 | Svennebring | H04L 41/147 |
| 2020/0042315 A1 | 2/2020 | Gupta | |
| 2021/0044672 A1* | 2/2021 | Gilling | G06F 9/541 |

OTHER PUBLICATIONS

Andreas Dietrich, The OpenRT Application Programming Interface—Towards A Common API for Interactive Ray Tracing—(Year: 2003).* springboottuttorial.com, "Breaking a Monolith into Microservices—Best Practices and Challenges," https://www.springboottutorial.com/breaking-a-monolith-into-microservices, Feb. 18, 2019, 8 pages.

S. Bhaskaran, "Migrating Monolithic Applications to Microservices," https://dzone.com/articles/migrating-monolithic-applications-to-microservices, Jan. 7, 2018, 3 pages.

nginx.com, Refactoring a Monolith into Microservices, nginx.com/blog/refactoring-a-monolith-into-microservices/, Mar. 8, 2016, 10 pages.

cloud.google.com, "Migrating to Microservices from a Monolithic App," https://cloud.google.com/appengine/docs/standard/go/microservice-migration, Oct. 16, 2019, 2 pages.

martinfowler.com, "How to Break a Monolith into Microservices," https://martinfowler.com/articles/break-monolith-into-microservices.html, Apr. 24, 2018, 10 pages.

docs.aws.amazon.com, "Create a Simple Microservice Using Lambda and API Gateway," https://docs.aws.amazon.com/lambda/latest/dg/with-on-demand-https-example-configure-event-source_1.html, 2019, 3 pages.

U.S. Appl. No. 16/662,908 filed in the name of Shubham Gupta on Oct. 24, 2019, and entitled "Designing Microservices for Applications."

* cited by examiner

| DATE | SLIDING WINDOW SLOT ID | RECORD ID | SOURCE STATE ID | DESTINATION STATE ID | $POI_1$ (ERROR) | $POI_2$ (WARNING) | $POI_3$ (INFO) | $POI_N$ (CUSTOM) |
|---|---|---|---|---|---|---|---|---|
| 22-12-2020 | 0 | REC-0001 | S-ST-001 | S-ST-002 | 1 | 0 | 0 | 0 |
| 22-12-2020 | 0 | REC-0002 | S-ST-002 | S-ST-003 | 0 | 1 | 0 | 0 |
| 22-12-2020 | 1 | REC-0003 | S-ST-003 | S-ST-004 | 0 | 0 | 1 | 1 |
| 22-12-2020 | 1 | REC-0004 | S-ST-004 | S-ST-007 | 1 | 1 | 0 | 0 |
| 22-12-2020 | 1 | REC-0005 | S-ST-005 | S-ST-002 | 0 | 0 | 0 | 0 |
| 22-12-2020 | 3 | REC-0006 | S-ST-006 | S-ST-007 | 0 | 1 | 0 | 0 |
| 22-12-2020 | 3 | REC-0007 | S-ST-007 | S-ST-014 | 0 | 1 | 1 | 1 |
| 22-12-2020 | 3 | REC-0008 | S-ST-008 | S-ST-011 | 1 | 0 | 0 | 0 |
| 22-12-2020 | 3 | REC-0009 | S-ST-009 | S-ST-002 | 0 | 0 | 1 | 1 |
| 22-12-2020 | 4 | REC-0010 | S-ST-010 | S-ST-014 | 1 | 0 | 0 | 0 |
| 22-12-2020 | 4 | REC-0011 | S-ST-011 | S-ST-018 | 1 | 1 | 0 | 0 |
| 22-12-2020 | 4 | REC-0012 | S-ST-012 | S-ST-014 | 1 | 0 | 0 | 0 |
| 22-12-2020 | 4 | REC-0013 | S-ST-013 | S-ST-002 | 0 | 1 | 0 | 0 |
| 22-12-2020 | 5 | REC-0014 | S-ST-014 | S-ST-019 | 0 | 1 | 0 | 0 |
| 22-12-2020 | 5 | REC-0015 | S-ST-015 | S-ST-015 | 0 | 1 | 0 | 0 |
| 22-12-2020 | 5 | REC-0016 | S-ST-016 | S-ST-019 | 1 | 0 | 0 | 0 |
| 22-12-2020 | 5 | REC-0017 | S-ST-017 | S-ST-002 | 0 | 1 | 0 | 0 |
| 22-12-2020 | 5 | REC-0018 | S-ST-018 | S-ST-015 | 1 | 1 | 0 | 0 |
| 22-12-2020 | 5 | REC-0019 | S-ST-019 | S-ST-018 | 0 | 0 | 0 | 0 |

FIG. 4

| DATE | SLIDING WINDOW SLOT ID | RECORD ID | ASSOCIATION RULE ID | SOURCE STATE BEGIN ID | SOURCE STATE END ID | SOURCE POI (X) | DESTINATION STATE BEGIN ID | DESTINATION STATE END ID | DESTINATION POI (Y) | SUP (X) | SUP (Y) | CONF (X→Y) | LIFT (X→Y) |
|---|---|---|---|---|---|---|---|---|---|---|---|---|---|
| 22-12-2020 | 0 | REC-0001 | S-ST-001 | S-ST-002 | S-ST-002 | E | S-ST-002 | S-ST-002 | W | 0.6 | 0.9 | 0.1 | 1.3 |
| 22-12-2020 | 4 | REC-0011 | S-ST-011 | S-ST-018 | S-ST-019 | I | S-ST-018 | S-ST-018 | I | 0.9 | 0.3 | 0.9 | 1.2 |
| 22-12-2020 | 4 | REC-0012 | S-ST-012 | S-ST-014 | S-ST-015 | W | S-ST-019 | S-ST-014 | E | 0.3 | 0.3 | 0.6 | 1 |
| 22-12-2020 | 4 | REC-0013 | S-ST-012 | S-ST-002 | S-ST-019 | E | S-ST-002 | S-ST-04 | W | 0.3 | 0.8 | 0.4 | 0.4 |
| 22-12-2020 | 4 | REC-0014 | S-ST-013 | S-ST-019 | S-ST-019 | E | S-ST-019 | S-ST-020 | I | 0.5 | 0.2 | 0.2 | 1.4 |
| 22-12-2020 | 5 | REC-0015 | S-ST-015 | S-ST-015 | S-ST-015 | W | S-ST-015 | S-ST-017 | W | 0.6 | 0.1 | 0.7 | 1.7 |
| 22-12-2020 | 5 | REC-0016 | S-ST-016 | S-ST-019 | S-ST-019 | I | S-ST-019 | S-ST-015 | E | 0.1 | 0.4 | 0.5 | 0.1 |
| 22-12-2020 | 5 | REC-0017 | S-ST-011 | S-ST-002 | S-ST-015 | E | S-ST-002 | S-ST-002 | E | 0.4 | 0.2 | 0.7 | 0.2 |
| 22-12-2020 | 5 | REC-0018 | S-ST-018 | S-ST-015 | S-ST-018 | E | S-ST-015 | S-ST-019 | E | 0.8 | 0.6 | 0.3 | 0.4 |
| 22-12-2020 | 5 | REC-0019 | S-ST-019 | S-ST-019 | S-ST-019 | W | S-ST-018 | S-ST-015 | I | 0.2 | 0.9 | 0.8 | 1.4 |
| 22-12-2020 | 6 | REC-0001 | S-ST-018 | S-ST-015 | S-ST-002 | E | S-ST-019 | S-ST-017 | E | 0.6 | 0.3 | 0.6 | 1.3 |
| 22-12-2020 | 6 | REC-0011 | S-ST-011 | S-ST-002 | S-ST-002 | I | S-ST-015 | S-ST-022 | I | 0.9 | 0.3 | 0.9 | 1.2 |
| 22-12-2020 | 6 | REC-0012 | S-ST-013 | S-ST-019 | S-ST-019 | E | S-ST-002 | S-ST-005 | E | 0.3 | 0.3 | 0.3 | 0.1 |
| 22-12-2020 | 7 | REC-0013 | S-ST-011 | S-ST-015 | S-ST-015 | I | S-ST-019 | S-ST-04 | I | 0.3 | 0.9 | 0.3 | 0.2 |
| 22-12-2020 | 7 | REC-0014 | S-ST-011 | S-ST-018 | S-ST-015 | E | S-ST-015 | S-ST-020 | E | 0.5 | 0.3 | 0.2 | 0.4 |
| 22-12-2020 | 7 | REC-0015 | S-ST-001 | S-ST-018 | S-ST-018 | W | S-ST-018 | S-ST-017 | I | 0.6 | 0.3 | 0.7 | 1.7 |
| 22-12-2020 | 8 | REC-0016 | S-ST-016 | S-ST-019 | S-ST-019 | I | S-ST-019 | S-ST-022 | E | 0.4 | 0.8 | 0.5 | 0.1 |
| 22-12-2020 | 9 | REC-0017 | S-ST-011 | S-ST-002 | S-ST-002 | W | S-ST-002 | S-ST-003 | W | 0.8 | 0.2 | 0.7 | 0.2 |
| 22-12-2020 | 9 | REC-0018 | S-ST-012 | S-ST-018 | S-ST-018 | W | S-ST-018 | S-ST-016 | W | 0.2 | 0.2 | 0.3 | 0.4 |
| 22-12-2020 | 9 | REC-0019 | S-ST-019 | S-ST-014 | S-ST-014 | I | S-ST-014 | S-ST-015 | I | 0.1 | 0.6 | 0.8 | 1.4 |

FIG. 6

| TIME PERIOD | ANTECEDENT STATE BEGIN ID | ANTECEDENT STATE END ID | SOURCE POI (X) | CONSEQUENT STATE BEGIN ID | CONSEQUENT STATE END ID | DESTINATION POI (Y) | SUP (X) | SUP (Y) | CONF (X→Y) | LIFT (X→Y) |
|---|---|---|---|---|---|---|---|---|---|---|
| 22-12-2020 | S-ST-002 | S-ST-018 | W | S-ST-011 | S-ST-012 | E | 0.6 | 0.9 | 0.9 | 1.3 |
| 22-12-2020 | S-ST-018 | S-ST-019 | E | S-ST-022 | S-ST-023 | E | 0.9 | 0.3 | 0.9 | 1.2 |
| 22-12-2020 | S-ST-014 | S-ST-015 | W | S-ST-019 | S-ST-014 | E | 0.3 | 0.3 | 0.6 | 1 |
| 22-12-2020 | S-ST-002 | S-ST-019 | W | S-ST-002 | S-ST-04 | E | 0.3 | 0.8 | 0.8 | 0.4 |
| 22-12-2020 | S-ST-019 | S-ST-015 | I | S-ST-019 | S-ST-020 | E | 0.5 | 0.2 | 0.9 | 1.4 |
| 22-12-2020 | S-ST-014 | S-ST-015 | W | S-ST-015 | S-ST-017 | W | 0.6 | 0.1 | 0.7 | 1.7 |
| 22-12-2020 | S-ST-019 | S-ST-021 | I | S-ST-019 | S-ST-015 | E | 0.1 | 0.4 | 0.7 | 0.1 |
| 22-12-2020 | S-ST-012 | S-ST-015 | E | S-ST-002 | S-ST-004 | E | 0.4 | 0.4 | 0.7 | 0.2 |
| 22-12-2020 | S-ST-015 | S-ST-018 | W | S-ST-015 | S-ST-019 | E | 0.8 | 0.2 | 0.8 | 0.4 |

CONTROLLING OPERATION OF MICROSERVICES UTILIZING ASSOCIATION RULES DETERMINED FROM MICROSERVICES RUNTIME CALL PATTERN DATA

FIELD

The field relates generally to information processing, and more particularly to techniques for managing microservices.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. In some cases, containers are used to provide microservices in the given cloud-based information processing system. However, significant challenges can arise in the management of microservices in cloud-based information processing systems.

SUMMARY

Illustrative embodiments of the present invention provide techniques for controlling operation of microservices utilizing association rules determined from runtime call pattern data of the microservices.

In one embodiment, an apparatus comprises at least one processing device comprising a processor coupled to a memory. The at least one processing device is configured to perform the steps of obtaining runtime call pattern data for a plurality of microservices in an information technology infrastructure, generating a model of the runtime call pattern data characterizing transitions between a plurality of states of the plurality of microservices, and capturing point of interest events from the runtime call pattern data utilizing the generated model. The at least one processing device is also configured to perform the step of determining, for a given sliding window time slot of the runtime call pattern data, association rules between the captured point of interest events, a given one of the association rules characterizing a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot. The at least one processing device is further configured to perform the step of controlling operation of the plurality of microservices in the information technology infrastructure based at least in part on the determined association rules.

These and other illustrative embodiments include, without limitation, methods, apparatus, networks, systems and processor-readable storage media.

BRIEF DESCRIPTION OF THE DRAWINGS

FIG. 4 shows a table of call state transitions in microservices runtime data in an illustrative embodiment.

FIG. 6 shows a table of association rules captured from call state transitions of microservices runtime data in an illustrative embodiment.

FIG. 7 shows a table of most frequent dependency rules for call state transitions in microservices runtime data in an illustrative embodiment.

DETAILED DESCRIPTION

Figure 1:
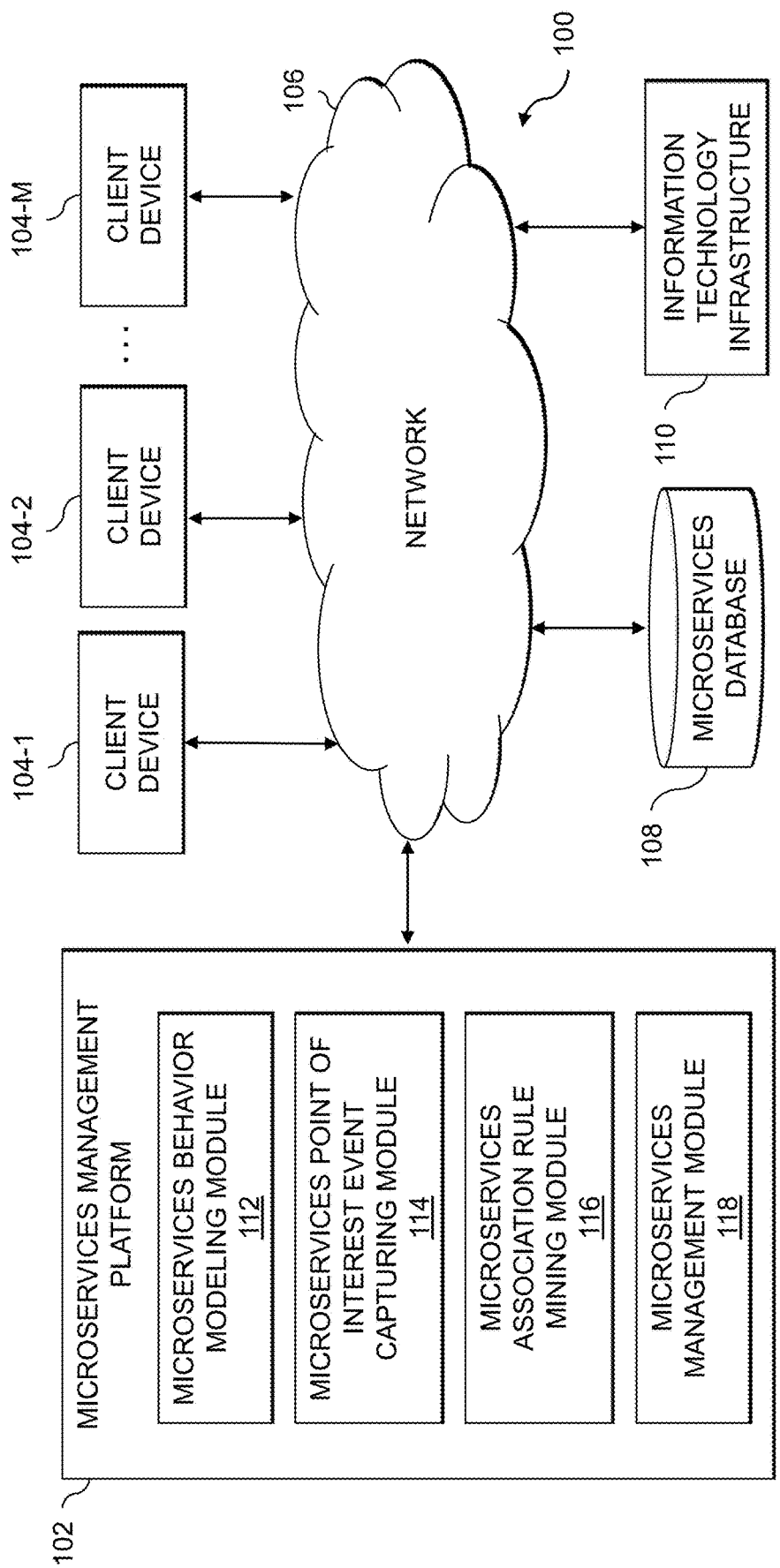
FIG. 1 is a block diagram of an information processing system for controlling operation of microservices utilizing association rules determined from runtime call pattern data of the microservices in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

FIG. 1 shows an information processing system 100 configured in accordance with an illustrative embodiment. The information processing system 100 is assumed to be built on at least one processing platform and provides functionality for controlling operation of microservices utilizing association rules determined from runtime call pattern data of the microservices. The information processing system 100 includes a microservices management platform 102, which is coupled via a network 106 to an information technology (IT) infrastructure 110. The IT infrastructure 110 is assumed to be accessed, over network 106, by client devices 104-1, 104-2, . . . 104-M (collectively, client devices 104). The system 100 also includes a microservices database 108 coupled to the network 106, which may store various information related to operation of microservices hosted by assets of the IT infrastructure 110. The assets may include, by way of example, physical and virtual computing resources in the IT infrastructure 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), software containers also referred to as containers, etc.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The microservices database 108 may be any type of database configured to store information related to microservices in the IT infrastructure 110, including models of microservices call patterns, association rules for microservices hosted on assets of the IT infrastructure 110, etc. The microservices database 108 in some embodiments is implemented using one or more storage systems or devices associated with the microservices management platform 102. In some embodiments, one or more of the storage systems utilized to implement the microservices database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the microservices management platform 102, as well as to support communication between the microservices management platform 102 and other related systems and devices not explicitly shown.

In some embodiments, the client devices 104 may implement host agents that are configured for communication with the microservices management platform 102. The host agents implemented by the client devices 104 may be configured to interact with a graphical user interface and visualizations thereof that are produced by the microservices management platform 102 for presenting results of analytics and insight generated from dependency rules in microservices runtime data. The host agents may permit users of the client devices 104 to interact with user interface features of the graphical user interface to modify proposed designs of microservices for one or more applications, to select microservices to be created, to deploy created microservices in the IT infrastructure 110, to perform scalable and resilient system design of the IT infrastructure 110, to perform dynamic dependency analysis for microservices in the IT infrastructure 110, to perform issue remediation for issues associated with microservices in the IT infrastructure 110, to perform proactive change management for microservices in the IT infrastructure 110, etc.

It should be noted that a "host agent" as this term is generally used herein may comprise an automated entity, such as a software entity running on a processing device. Accordingly, a host agent need not be a human entity.

Although shown as separate from the client devices 104 and the IT infrastructure 110 in the FIG. 1 embodiment, it should be appreciated that the microservices management platform 102 may be implemented at least in part within one or more of the client devices 104 or at least in part within the IT infrastructure 110, or combinations thereof, in some embodiments.

The microservices management platform 102 in the FIG. 1 embodiment is assumed to be implemented using at least one processing device. Each such processing device generally comprises at least one processor and an associated memory, and implements one or more functional modules for controlling certain features of the microservices management platform 102. In the FIG. 1 embodiment, the microservices management platform 102 implements a microservices behavior modeling module 112, a microservices point of interest event capturing module 114, a microservices association rule mining module 116, and a microservices management module 118.

The microservices management platform 102 is configured to obtain runtime call pattern data for microservices of the IT infrastructure 110 (e.g., from the microservices database 108, for one or more monitoring tools associated with the microservices in the IT infrastructure 110, etc.). The microservices behavior monitoring module 112 is configured to generate a model of the runtime call pattern data characterizing transitions between states of the microservices. The microservices point of interest event capturing module 114 is configured to capture point of interest events from the runtime call pattern data utilizing the generated model. The microservices association rule mining module 116 is configured to determine, for a given sliding window time slot of the runtime call pattern data, association rules between the captured point of interest events. A given one of the association rules may characterize a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot. The microservices management module 118 is configured to control operation of the plurality of microservices in the IT infrastructure based at least in part on the determined association rules.

It is to be appreciated that the particular arrangement of the microservices management platform 102, the microservices behavior modeling module 112, the microservices point of interest event capturing module 114, the microservices association rule mining module 116, and the microservices management module 118 illustrated in the FIG. 1 embodiment is presented by way of example only, and alternative arrangements can be used in other embodiments. As discussed above, for example, the microservices management platform 102, the microservices behavior modeling module 112, the microservices point of interest event capturing module 114, the microservices association rule mining module 116, and the microservices management module 118 may in some embodiments be implemented internal to one or more of the client devices 104, the IT infrastructure 110, or combinations thereof. As another example, the functionality associated with the microservices behavior modeling module 112, the microservices point of interest event capturing module 114, the microservices association rule mining module 116, and the microservices management module 118 may be combined into fewer modules, or separated across more modules with the multiple modules possibly being implemented with multiple distinct processors or processing devices.

At least portions of the microservices behavior modeling module 112, the microservices point of interest event capturing module 114, the microservices association rule mining module 116, and the microservices management module 118 may be implemented at least in part in the form of software that is stored in memory and executed by a processor.

It is to be understood that the particular set of elements shown in FIG. 1 for controlling operation of microservices utilizing association rules determined from runtime call pattern data of the microservices is presented by way of illustrative example only, and in other embodiments additional or alternative elements may be used. Thus, another embodiment may include additional or alternative systems, devices and other network entities, as well as different arrangements of modules and other components.

The microservices management platform 102 and other portions of the system 100 may be part of cloud infrastructure as will be described in further detail below. The cloud infrastructure hosting the microservices management platform 102 may also host one or more of the client devices 104, the microservices database 108 and the IT infrastructure 110.

The microservices management platform 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The microservices management platform 102, client devices 104, microservices database 108 and IT infrastructure 110 or components thereof may be implemented on respective distinct processing platforms, although numerous other arrangements are possible. For example, in some embodiments at least portions of the microservices management platform 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the microservices management platform 102, client devices 104, microservices database 108, IT infrastructure 110, or portions or components thereof, to reside in different data centers. Numerous other distributed implementations are possible. The microservices management platform 102 or portions thereof can also be implemented in a distributed manner across multiple data centers.

Additional examples of processing platforms utilized to implement the microservices management platform 102 and other portions of the system 100 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for controlling operation of microservices utilizing association rules determined from runtime call pattern data of the microservices will now be described in more detail with reference to the flow diagram of FIG. 2. It is to be understood that this particular process is only an example, and that additional or alternative processes for controlling operation of microservices utilizing association rules determined from runtime call pattern data of the microservices may be used in other embodiments.

In this embodiment, the process includes steps 200 through 208. These steps are assumed to be performed by the microservices management platform 102 utilizing the microservices behavior modeling module 112, the microservices point of interest event capturing module 114, the microservices association rule mining module 116, and the microservices management module 118. The process begins with step 200, obtaining runtime call pattern data for a plurality of microservices in an IT infrastructure. In step 202, a model of the runtime call pattern data is generated which characterizes transitions between a plurality of states of the plurality of microservices. Step 202 may include modeling runtime execution of the plurality of microservices as a finite state machine with functional code segments of the plurality of microservices comprising states of the finite state machine and calls between the functional code segments comprising transitions between the states of the finite state machine. Step 202 may also or alternatively include generating a network graph, wherein nodes of the network graph represent functional code segments of the plurality of microservices and calls between the functional code segments represent edges between the nodes of the network graph.

In step 204, point of interest events are captured from the runtime call pattern data utilizing the model generated in step 202. The captured point of interest events may comprise at least one of: errors encountered during execution of the plurality of microservices; warnings encountered during execution of the plurality of microservices; and informational events produced during execution of the plurality of microservices. Each of the captured point of interest events may be associated with one of a set of configurable sliding window time slots including the given sliding window time slot.

Association rules between the captured point of interest events are then determined for a given sliding window time slot of the runtime call pattern data in step 206. A given one of the association rules characterizes a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot. Step 206 may include computing a first support of the first point of interest event, the first support denoting a frequency of occurrence of the first point of interest event in the given sliding window time slot of the runtime call pattern data, and computing a second support of the second point of interest event, the second support denoting a frequency of occurrence of the second point of interest event in the given sliding window timeslot of the runtime call pattern data. Step 206 may further include computing a confidence of an association between the first point of interest event and the second point of interest event, the confidence denoting an extent to which the association is verified to be true over the runtime call pattern data, and computing a lift of the association between the first point of interest event and the second point of interest event, the lift denoting a ratio of the computed first support and the second support to expected support of the first point of interest event and the second point of interest event if the first point of interest event and the second point of interest event were independent. The given association rule may be created responsive to (i) determining that the computed confidence of the association between the first point of interest event and the second point of interest event exceeds a designated confidence threshold and (ii) determining that the computed lift of the association between the first point of interest event and the second point of interest event exceeds a designated lift threshold.

Figure 2:
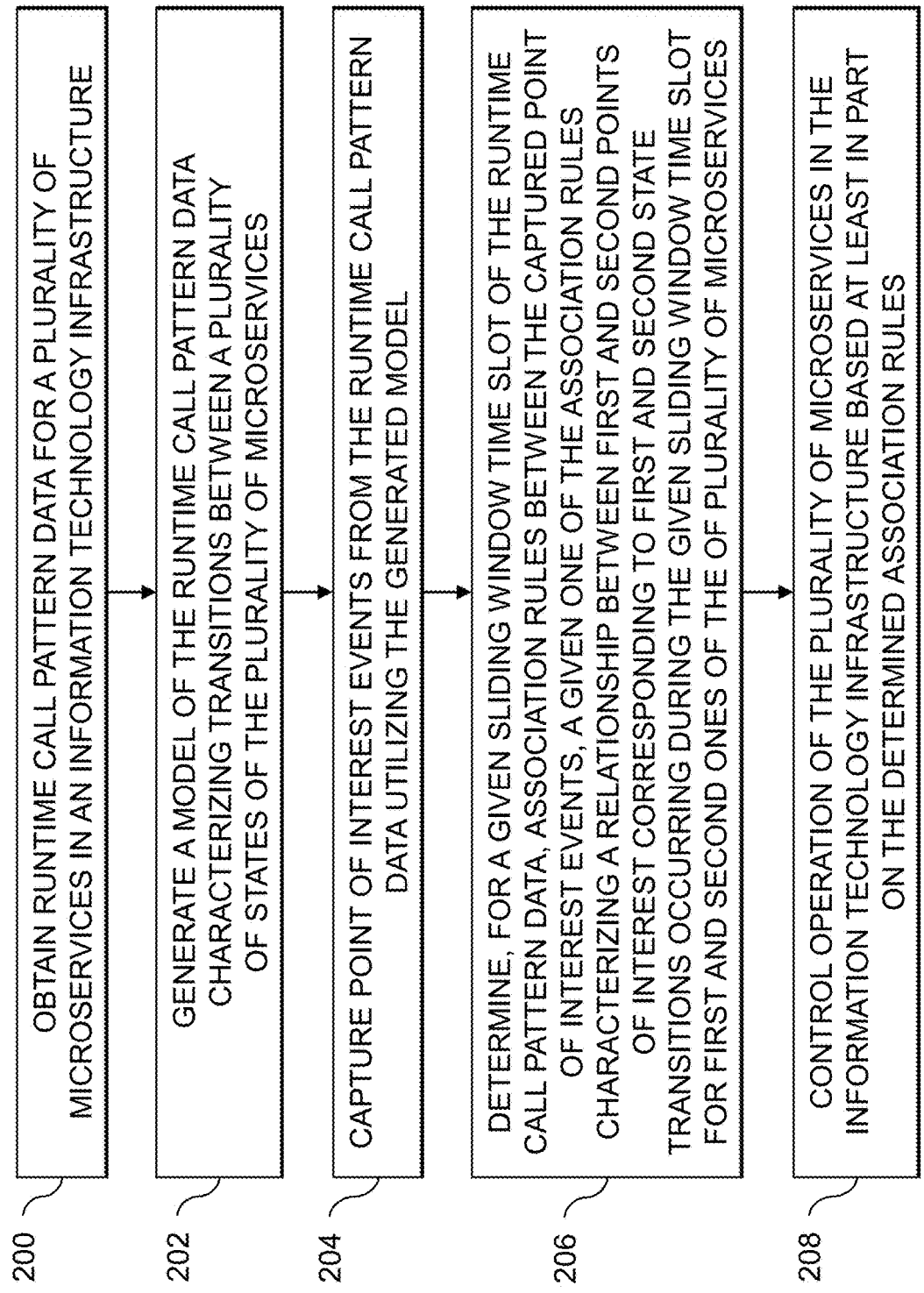
FIG. 2 is a flow diagram of an exemplary process for controlling operation of microservices utilizing association rules determined from runtime call pattern data of the microservices in an illustrative embodiment.

The FIG. 2 process continues with step 208, controlling operation of the plurality of microservices in the information technology infrastructure based at least in part on the determined association rules. Step 208 may comprise identifying dependency patterns among the plurality of microservices utilizing a subset of the determined association rules. Identifying the dependency patterns among the plurality of microservices utilizing the subset of the determined association rules may comprise utilizing a top-K association rules discovery algorithm, the top-K association rules discovery algorithm selecting K number of the determined association rules for inclusion in the subset having an associated confidence exceeding a designated confidence threshold. Step 208 may include one or more of adjusting a configuration of one or more of the plurality of microservices of the information technology infrastructure, performing dynamic dependency analysis for the plurality of microservices, performing issue remediation for one or more issues associated with one or more of the plurality of microservices, and performing proactive change management for one or more of the plurality of microservices.

As described above, a microservices-based application architecture provides various advantages relative to the use of monolithic applications. For example, a microservices-based application architecture may answer many of the problems of complex IT systems that struggle with a monolithic application approach. In some implementations, monolithic applications are first migrated to a microservices-based application architecture with relatively few microservices. As a system evolves and matures, however, the number of microservices used scales to higher and higher numbers of microservices. For example, a mature implementation may include logical microsegments with combined functionality provided through a cluster of thousands of microservices. Examples of real-world enterprises having complex microservices-based architectures include Uber which has 4,000+ operational microservices, Amazon which has 1,000+ microservices which collaborate to fulfill an order, and Netflix which as of 2017 has used 700+ loosely-coupled microservices. Having thousands of events happening in hundreds or thousands of microservices every second, however, presents significant challenges for keeping a system intact and stable in a production environment. This is further complicated in that the microservices may have frequent or continuous changes throughout their development.

Container and microservices management platforms may focus on various information when managing a microservices ecosystem. Such information may include, but is not limited to: runtime diagnostics, tracing and instrumentation for health checks; application metrics for high availability using clustering and failover; load balancing and traffic management; deployment logs and changes since issues often occur immediately after a change; and notifications for deployment status, application crashes and other information; etc.

Illustrative embodiments provide approaches for intelligently analyzing the dynamic runtime behavior of microservices in a cluster (e.g., including clusters with large numbers of microservices, such as hundreds or thousands of microservices). Microservice runtime occurrence patterns are analyzed to determine the hidden relationships among factors to discover their association rules based on areas of interest. Such hidden association rules may be discovered in some embodiments utilizing finite state machine modeling and statistical data mining approaches such as multi-relation association rules and top-K association rules discovery techniques. Advantageously, illustrative embodiments use such behavioral intelligence for an incremental knowledge discovery system for complex microservice ecosystems which cannot be achieved manually using conventional container and microservices management platforms.

In some embodiments, solutions are associated with four steps or phases: (1) modeling microservices call stacks as a finite state machine; (2) multi association rule mining from events in microservices runtime data; (3) establishing most frequent dependency patterns among microservices using top-K association rules discovery; and (4) learning and insight for controlling operation of microservice ecosystems.

In the first step or phase, the system models a pool of microservices runtime execution data as a finite state machine with functional code segments (e.g., modules, classes, functions of the microservices) as the states or nodes, and calls among them as transitions or edges. Formally, this can be expressed as a deterministic finite automaton described by a five element tuple $(Q, \Sigma, \delta, q_0, F)$. $Q$ represents a finite set of microservices runtime states denoted by function calls. $\Sigma$ represents a finite nonempty input alphabet denoted by function call parameters. $\delta$ represents a series of transition functions denoted by the function being called. $q_0$ represents the starting state of the microservice execution. $F$ represents a set of accepting states denoted by the function being called.

Figure 3:
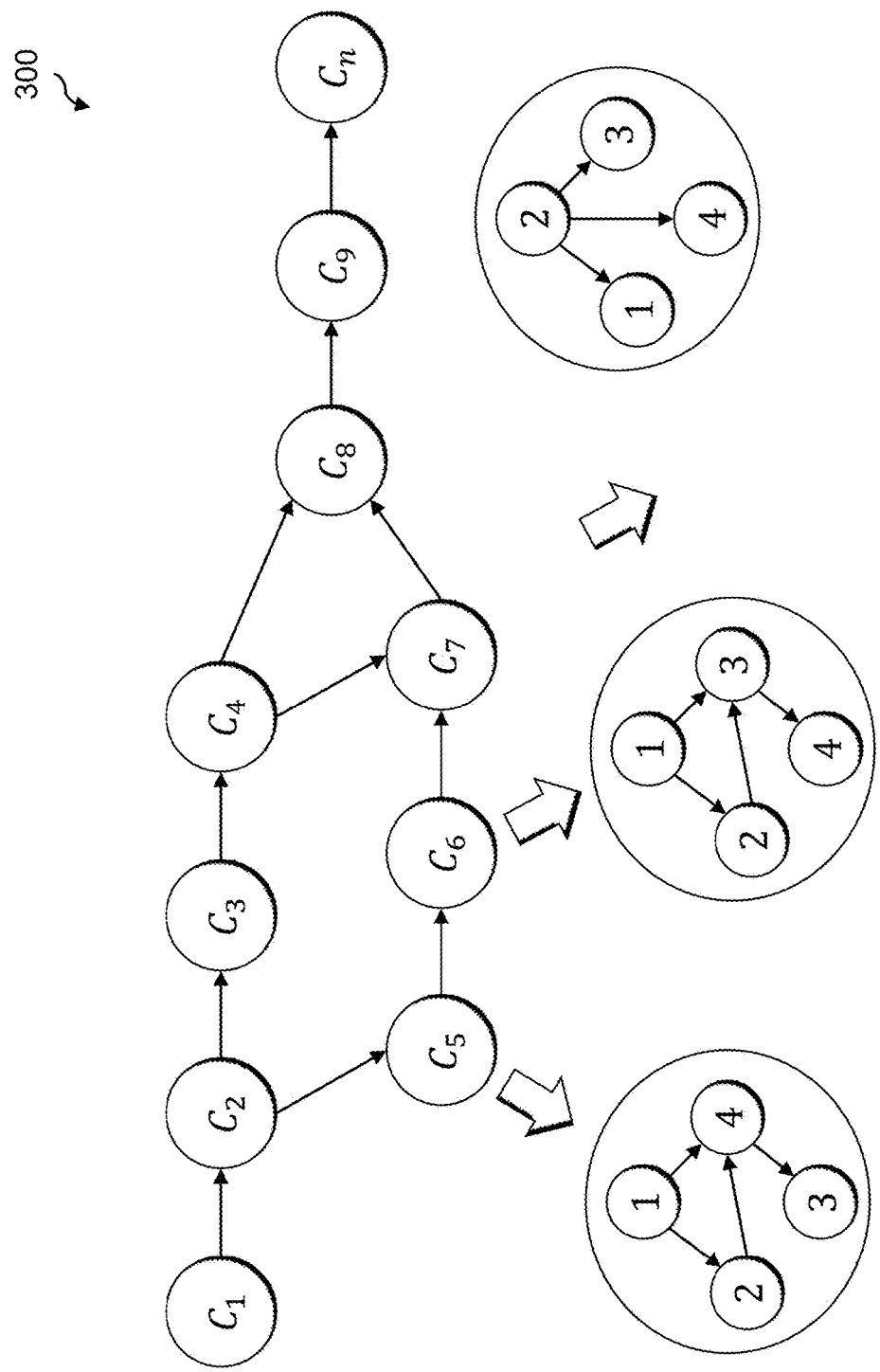
FIG. 3 shows a call pattern for a set of microservices in an illustrative embodiment.

As a network graph, this may be expressed as an n-node graph $G=(N, E)$ with n nodes and n−1 edges, where $1<|N|\leq \mathbb{N}1$ and $0<|E|\leq \mathbb{N}1$. G is an ordered pair and may be a directed or undirected cyclic graph depending on the runtime code flow (e.g., the basis path). FIG. 3 shows a call pattern 300 for a set of microservices denoted $C_1, C_2, \ldots, C_n$ illustrating finite state transitions with $N=\{n_1, n_2, n_3, n_4, n_5, n_6, n_7, n_8, n_9, \ldots, n_n\}$ and $E=\{\{n_1, n_2\}, \{n_2, n_3\}, \{n_3, n_4\}, \{n_4, n_5\}, \{n_5, n_6\}, \{n_6, n_7\}, \{n_7, n_8\}, \{n_8, n_9\}, \{n_{n-1}, n_n\}\}$. FIG. 3 also shows expanded granular states and transitions for microservices $C_5$, $C_6$ and $C_9$. The system will analyze the data patterns generated at runtime as well as diagnostic information such as errors, information or warnings that occur while transitioning from one state to another. This is captured as one or more Points of Interest (POIs).

Figure 5:
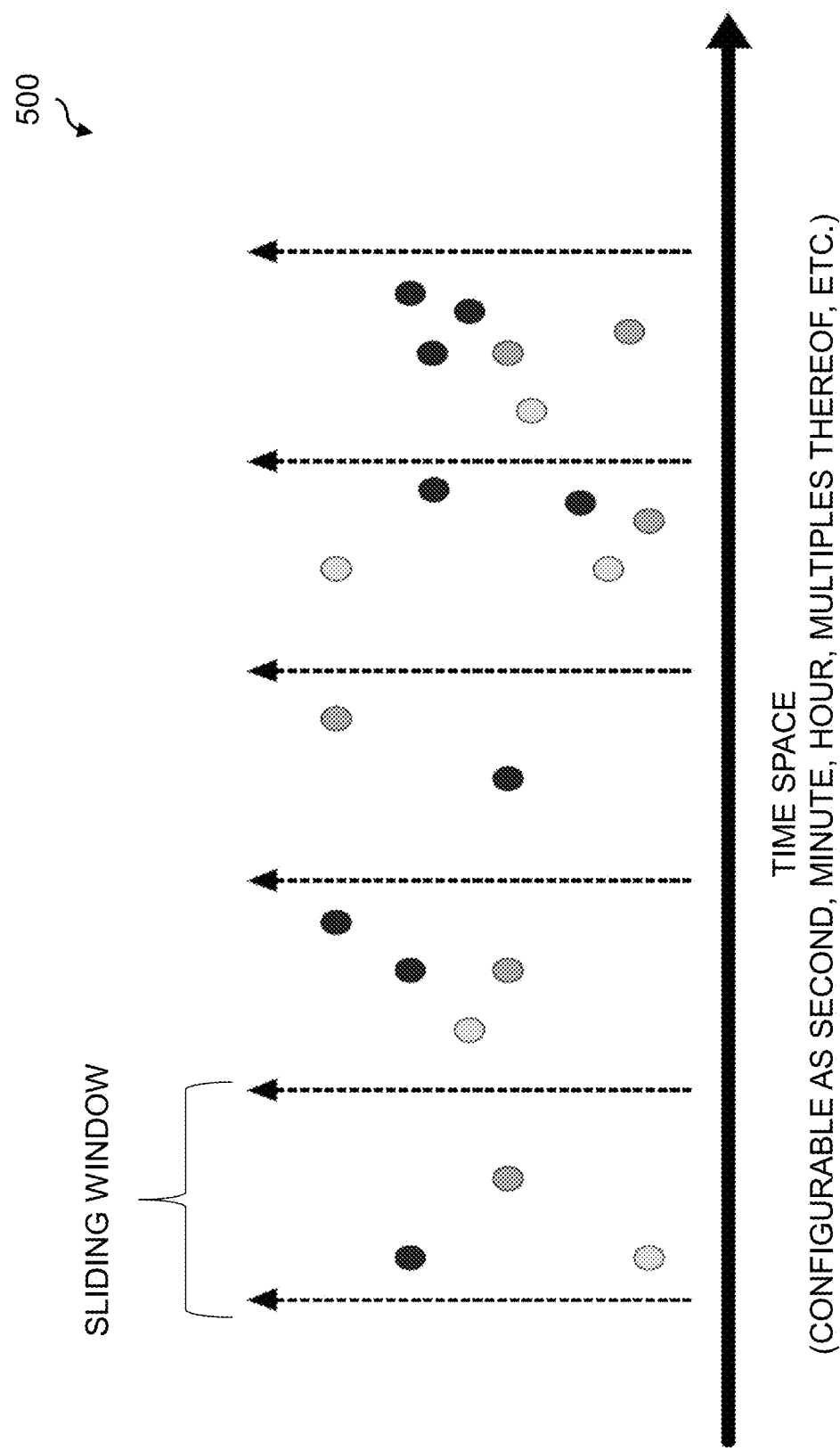
FIG. 5 shows a plot of call state transitions in microservices runtime data in an illustrative embodiment.

Consider, as an example, a microservice A, function A that calls microservice B, function B to transition from state S1 to state S2. If there is any error, warning, custom information or other diagnostics detected for this transition, this can be represented as a POI in the system. The system may continuously capture such data at runtime. FIG. 4 shows a table 400 illustrating such captured information. The table 400 in FIG. 4 includes columns for a data, sliding window slot identifier (ID), record ID, source state ID, destination state ID, and various POIs 1 through N. More particularly, $POI_1$ represents an error, $POI_2$ represents a warning, $POI_3$ represents information, and $POI_N$ is custom-defined. For the POIs, 1 means an event occurred while 0 means the event did not occur. FIG. 5 shows a plot 500 of the POI data from the table 400 of FIG. 4 on a time scale using a sliding window. The sliding window duration can be configurable to include various desired intervals (second, minute, hour, day, multiples thereof, etc.) for particular implementations. Generally, a shorter sliding window will provide improved accuracy, but at the price of increased processing demand while a longer sliding window will have lower processing demand. In the plot 500 of FIG. 5, the dots shaded in darkest gray denote errors, the dots shaded in medium gray denote warnings, and the dots shaded in lightest gray denote informational and custom user-defined metrics.

In the second step or phase, multi association rule mining from events in the microservice runtime data is performed. The dataset generated as described above is subject to further analysis utilizing data mining techniques. An association rule is represented as $X \rightarrow Y$ over transactions T of a database D. X and Y, referred to as an itemset, can represent any of the state transitions for which an error, warning, information or custom user-defined metric POI is captured as described above.

Transaction T is a distinct instance of a POI, and database D is a set of all transactions that occurred in all past historical dates and sliding windows combined. Support is represented as SUP(X), and denotes how frequent an itemset appears in the dataset, where $SUP(X)=|t \in T; X \subseteq t|$. Confidence is represented as $CONF(X \rightarrow Y)$, and denotes the extent to which a rule has been found to be true over a finite set of transactions, where $CONF(X \rightarrow Y)=SUP(X \cup Y)/SUP(X)$. Lift is represented as $LIFT(X \rightarrow Y)$, and denotes the ratio of observed support to that expected if X and Y were independent. In some embodiments, a system looks for rules whose lift is greater than some threshold, such as LIFT=1 which denotes X (antecedent) and Y (consequent) are dependent factors. Association rules below that threshold or which are equal to zero (LIFT<1 or LIFT==0) will be ignored and filtered out.

In some embodiments, an association rule is created between a POI event occurring between state transitions S1→S2 as X and another POI event occurred between state transition S10→S11 as Y such that both the events belong to the same sliding window. POI instances of the occurrences will determine SUP, CONF and LIFT of that association rule in a particular sliding window. Configurable minimum support threshold and confidence constraints may be defined and used to qualify candidate association rules. It should be noted that it is theoretically possible to have millions of such combinations and thus the search space may grow exponentially depending on the ever increasing transitions states. Efficient search algorithms such as Apriori, Eclat, FP-Growth and others may be used to take advantage of the "downward closure property" to minimize the search space in feasible proportions.

FIG. 6 shows a table 600 illustrating data collection denoting frequent association rules between POI events occurring in various state transitions captured for each sliding window time period. The table 600 includes columns for the date, a sliding window slot ID denoting a time window in which data was captured, an association rule ID denoting a unique identifier of an association rule, source state begin and end IDs denoting the microservice states where antecedent POI X occurs at runtime, destinations state begin and end IDs denoting the microservice states where the consequent POI Y occurs at runtime, a source POI (X) for the antecedent POI event, and a destination POI (Y) for the consequent POI event. The table 600 also includes columns for SUP(X) denoting the support value of POI X with respect to all the transactions that occurred in a particular sliding window, SUP(Y) denoted the support value of POI Y with respect to all the transactions that occurred in a particular sliding window, CONF(X→Y) denoting a confidence of the association rule X→Y with respect to all transactions that occurred in a particular sliding window, and LIFT(X→Y) denoting a lift of the association rule X→Y with respect to all transactions that occurred in a particular sliding window.

In the third step or phase, the most frequent dependency patterns among microservices are established using top-K association rule discovery. The association rules data generated as described above are utilized to find the K most frequent rules with maximum confidence in a given set of past historical runtime data. The association rules data generated above is the transaction database D here, and the total number of data points collected in a finite time space is the total transactions T. The finite time space may be user-configurable, such as daily (e.g., 24 hours), weekly, monthly, etc. K is the number of association rules to be discovered, and MCT denotes a minimum confidence threshold. The output is the top-K association rules, or the K most frequent association rules in the database D having a confidence higher or equal to the minimum confidence threshold MCT. FIG. 7 shows a table 700 of the resultant output of top-K association rule discovery. The table 700 includes columns for the time period (which, as noted above is configurable as daily, weekly, monthly, etc.), antecedent state begin and end IDs, source POI (X), consequent state begin and end IDs, destination POI (Y), SUP(X), SUP(Y), CONF(X→Y), and LIFT(X→Y).

In the fourth step or phase, resultant learning and insights are derived from the top-K association rules. For example, the output shown in table 700 of FIG. 7 may lead to the following conclusion: microservice execution state transition between "S-ST-002" and "S-ST-018" is correlated with the state transition between "S-ST-011" and "S-ST-012" meaning that whenever there has been an error logged in a consequent step, there was a warning detected in an antecedent step. It should be appreciated that this is just one example of an analytical conclusion derived from association rules. Various other conclusions may be derived from these and other association rules. In some embodiments the top-K association rule discovery algorithm is implemented using Java or Python programming languages, or using data mining packages such as SPMF.

The association rules may be used to understand hidden patterns of dependent state transitions and their associated frequency of occurrence in a vast pool of microservices cluster runtime data. Such behavioral dynamics cannot be derived using conventional approaches such as static code analysis or runtime diagnostics instrumentation. Correlations between one POI (e.g., an error, info, warning or other custom user-defined metric) occurrence in one state transition with respect to some other POI occurrence in other state transitions may advantageously be used to provide an understanding of measures of interestingness or hidden patterns; in other words, the conditional probability of POI B occurring given POI A has occurred in a previous other state transition.

Learnings and insights from the association rules may be used to provide guidance to manage changes in different parts of a microservices cluster, and to determine how changes in one part of a microservices cluster has transient effects on other dependent parts of the microservices ecosystem based on historical runtime data. This enables behavioral control over complex transactions when large numbers of microservices are involved. Conventional static source code analysis and runtime diagnostics instrumentation do not provide such context. Further, association rules discovered using the techniques described herein can be used as the basis for an incremental knowledge discovery system.

Figure 8A:
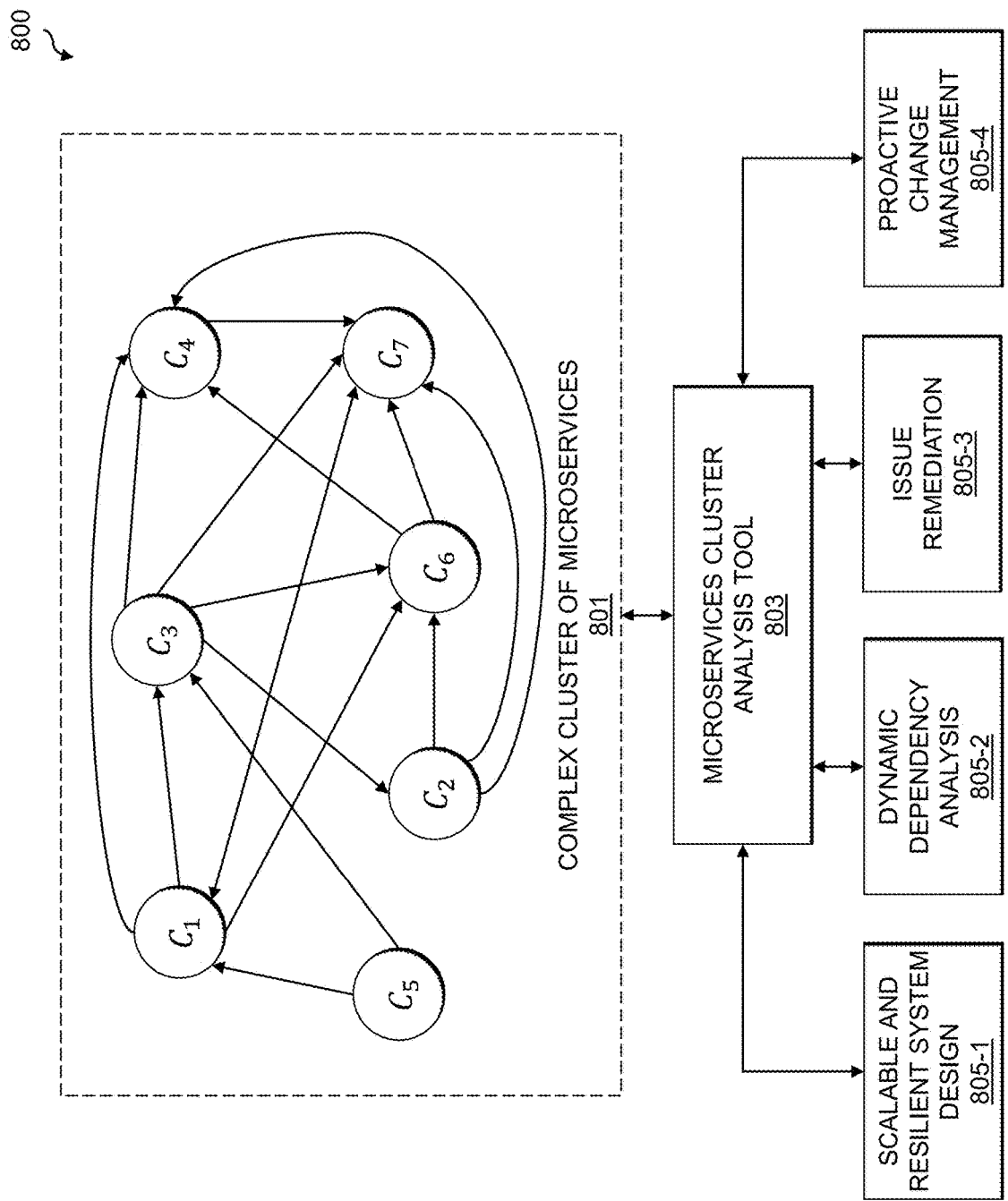
FIGS. 8A and 8B show a system flow for analyzing runtime data for a microservices cluster in an illustrative embodiment.
Figure 8B:
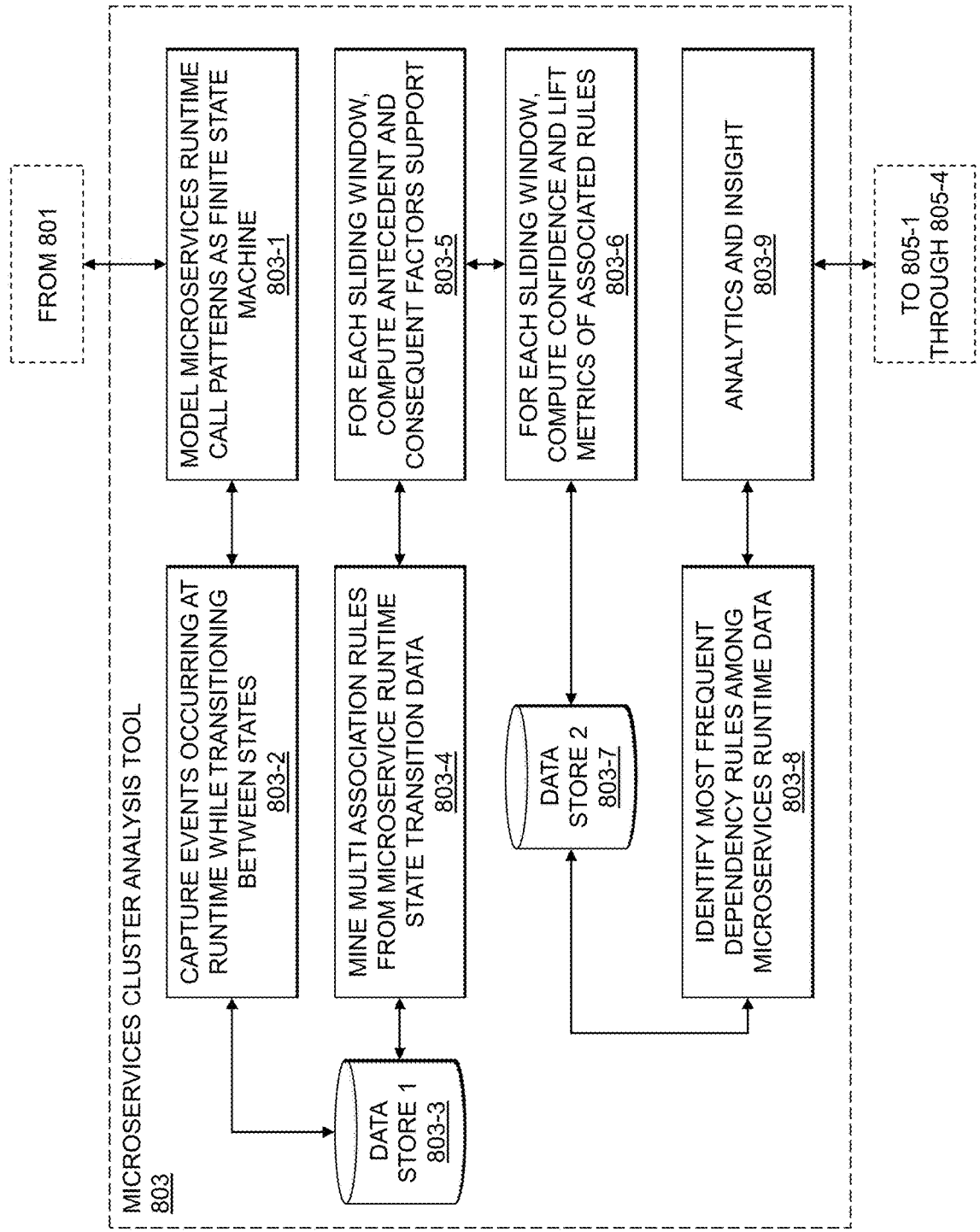

FIGS. 8A and 8B shows a system flow for analyzing runtime data for a microservices cluster. As shown in FIG. 8A, a system 800 includes a complex cluster of microservices 801 which provides runtime data to a microservices cluster analysis tool 803. The microservices cluster analysis tool 803 performs various processing on the microservices runtime data to perform various analytics, such as for scalable and resilient system design 805-1, dynamic dependency analysis 805-2, issue remediation 805-3, and proactive change management 805-4. The processing on the microservices runtime data by the microservices cluster analysis tool 803 is illustrated in detail in FIG. 8B.

As shown in FIG. 8B, such processing includes in step 803-1 modeling microservices runtime call patterns received from the microservices cluster 801 as a finite state machine. In step 803-2, events occurring at runtime while transitioning between states is captured. Such events may include POI events as described above. Such captured events are stored in a first datastore 803-3 (e.g., as table 400). Next, in step 803-4, multi association rules are mined from the microservice runtime state transition data. For each sliding window, support for antecedent and consequent factors are computed in step 803-5 and confidence and lift metrics of the associated rules are computed in step 803-6. Such association rules are stored in a second datastore 803-7 (e.g., as table 600). In step 803-8, the most frequent dependency rules among the microservices runtime data are identified (e.g., output as table 700). Analytics and insight is then performed using the identified dependency rules in step 803-9 and then provided for use in one or more of scalable and resilient system design 805-1, dynamic dependency analysis 805-2, issue remediation 805-3, and proactive change management 805-4, or other types of analysis and insight.

Advantageously, illustrative embodiments provide an intelligent and autonomous system to understand dynamic runtime call behavior patterns of a complex cluster of microservices to identify incremental hidden correlation dependencies among various sub-sections of a microservices ecosystem. In some embodiments, this is achieved by modelling the runtime behavior of the microservices as a finite sequence of state machines, collecting measures of interestingness among events happening and then using multi association rules mining along with top-K association rules discovery refinement to identify the top most frequent rules governing that runtime behavior. This enables scalable and resilient microservices design, dynamic dependency analysis, issue remediation, proactive guided change management, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling operation of microservices utilizing association rules determined from runtime call pattern data of the microservices will now be described in greater detail with reference to FIGS. 9 and 10. Although described in the context of system 100, these platforms may also be used to implement at least portions of other information processing systems in other embodiments.

Figure 9:
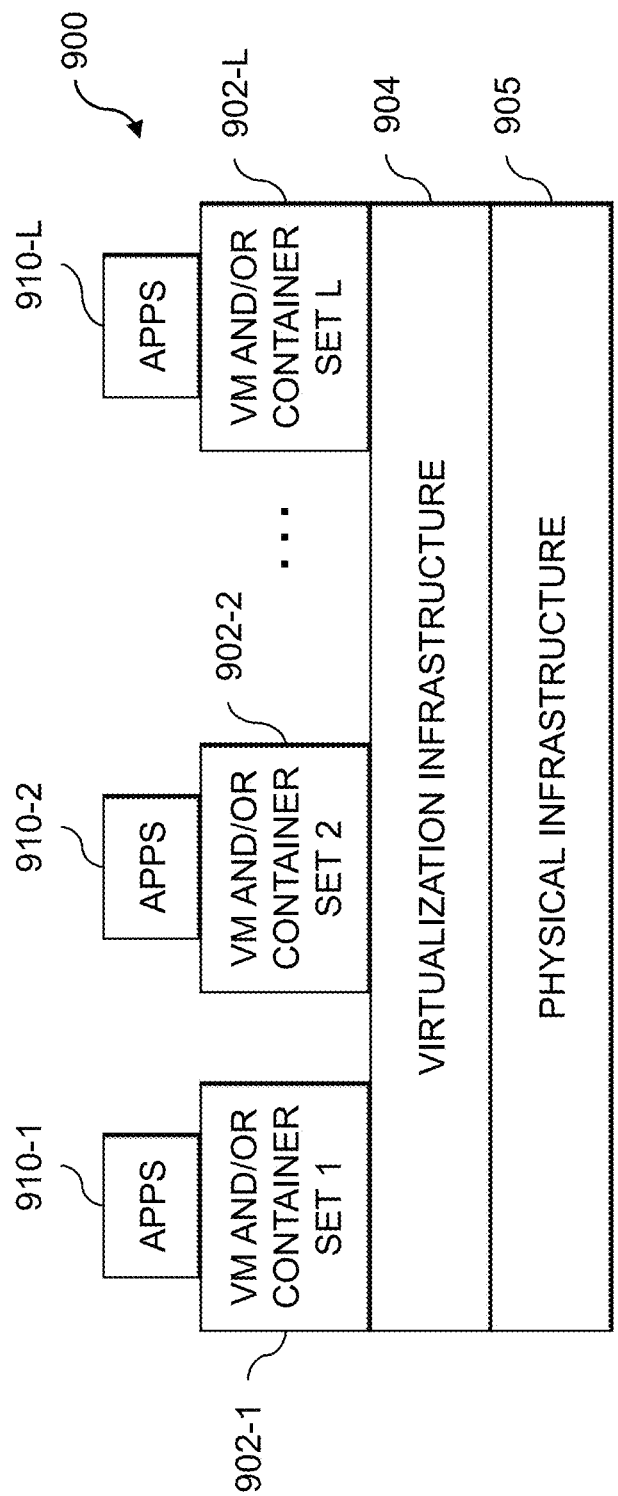
FIGS. 9 and 10 show examples of processing platforms that may be utilized to implement at least a portion of an information processing system in illustrative embodiments.
Figure 10:
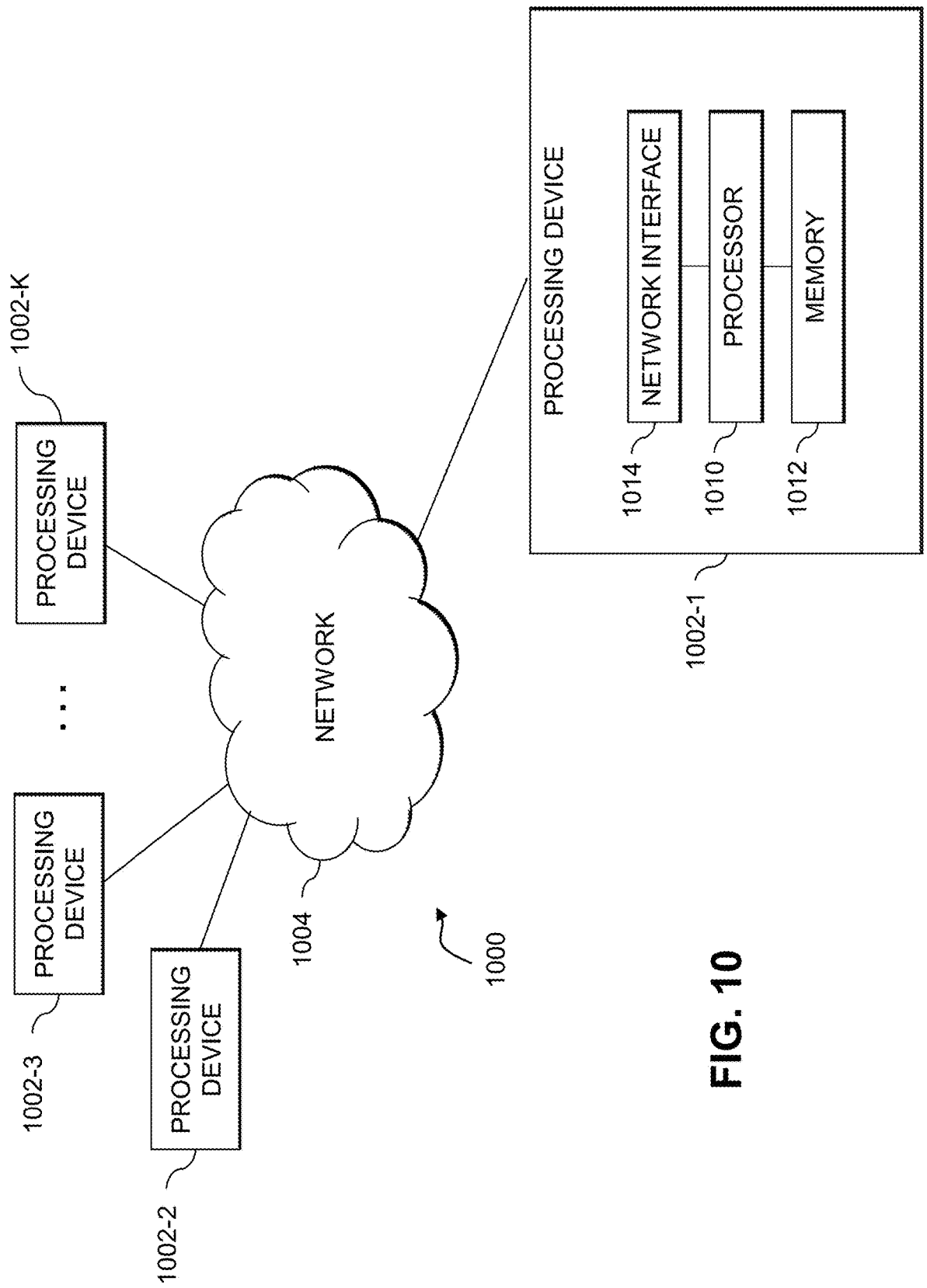

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, ... 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, ... 910-L running on respective ones of the VMs/container sets 902-1, 902-2, ... 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, ... 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling operation of microservices utilizing association rules determined from runtime call pattern data of the microservices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, applications, microservices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining runtime call pattern data for a plurality of microservices in an information technology infrastructure;
generating a model of the runtime call pattern data characterizing transitions between a plurality of states of the plurality of microservices;
capturing point of interest events from the runtime call pattern data utilizing the generated model;
determining, for a given sliding window time slot of the runtime call pattern data, association rules between the captured point of interest events, a given one of the association rules characterizing a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot; and
controlling operation of the plurality of microservices in the information technology infrastructure based at least in part on the determined association rules;
wherein determining, for the given sliding window time slot of the runtime call pattern data, the association rules between the captured point of interest events comprises determining the given one of the association rules based at least in part on identifying at least a threshold difference between (i) actual frequencies of occurrence of the first and second point of interest events and (ii) expected frequencies of occurrence of the first and second point of interest events; and
wherein determining the association rules comprises:
computing a first support of the first point of interest event, the first support denoting the actual frequency of occurrence of the first point of interest event in the given sliding window time slot of the runtime call pattern data; and
computing a second support of the second point of interest event, the second support denoting the actual frequency of occurrence of the second point of interest event in the given sliding window timeslot of the runtime call pattern data.

2. The apparatus of claim 1 wherein generating the model of the runtime call pattern data comprises modeling runtime execution of the plurality of microservices as a finite state machine with functional code segments of the plurality of microservices comprising states of the finite state machine and calls between the functional code segments comprising transitions between the states of the finite state machine.

3. The apparatus of claim 1 wherein generating the model of the runtime call pattern data comprises generating a network graph, wherein nodes of the network graph represent functional code segments of the plurality of microservices and calls between the functional code segments represent edges between the nodes of the network graph.

4. The apparatus of claim 1 wherein the captured point of interest events comprise at least one of:
errors encountered during execution of the plurality of microservices;
warnings encountered during execution of the plurality of microservices; and
informational events produced during execution of the plurality of microservices.

5. The apparatus of claim 1 wherein each of the captured point of interest events is associated with one of a set of configurable sliding window time slots including the given sliding window time slot.

6. The apparatus of claim 1 wherein determining the association rules further comprises:
computing a confidence of an association between the first point of interest event and the second point of interest event, the confidence denoting an extent to which the association is verified to be true over the runtime call pattern data; and
computing a lift of the association between the first point of interest event and the second point of interest event, the lift denoting a ratio of the computed first support and the second support to expected support of the first point of interest event and the second point of interest event if the first point of interest event and the second point of interest event were independent.

7. The apparatus of claim 6 wherein the given association rule is created responsive to (i) determining that the computed confidence of the association between the first point of interest event and the second point of interest event exceeds a designated confidence threshold and (ii) determining that the computed lift of the association between the first point of interest event and the second point of interest event exceeds a designated lift threshold.

8. The apparatus of claim 1 wherein controlling operation of the plurality of microservices in the information technology infrastructure based at least in part on the determined association rules comprises identifying dependency patterns among the plurality of microservices utilizing a subset of the determined association rules.

9. The apparatus of claim 8 wherein identifying the dependency patterns among the plurality of microservices utilizing the subset of the determined association rules comprises utilizing a top-K association rules discovery algorithm, the top-K association rules discovery algorithm selecting K number of the determined association rules for inclusion in the subset having an associated confidence exceeding a designated confidence threshold.

10. The apparatus of claim 1 wherein controlling operation of the plurality of microservices in the information technology infrastructure based at least in part on the determined association rules comprises adjusting a configuration of one or more of the plurality of microservices of the information technology infrastructure.

11. The apparatus of claim 1 wherein controlling operation of the plurality of microservices in the information technology infrastructure based at least in part on the determined association rules comprises performing dynamic dependency analysis for the plurality of microservices.

12. The apparatus of claim 1 wherein controlling operation of the plurality of microservices in the information technology infrastructure based at least in part on the determined association rules comprises performing issue remediation for one or more issues associated with one or more of the plurality of microservices.

13. The apparatus of claim 1 wherein controlling operation of the plurality of microservices in the information technology infrastructure based at least in part on the determined association rules comprises performing proactive change management for one or more of the plurality of microservices.

14. A computer program product comprising a non-transitory processor-readable storage medium having stored therein program code of one or more software programs, wherein the program code when executed by at least one processing device causes the at least one processing device to perform steps of:
obtaining runtime call pattern data for a plurality of microservices in an information technology infrastructure;
generating a model of the runtime call pattern data characterizing transitions between a plurality of states of the plurality of microservices;
capturing point of interest events from the runtime call pattern data utilizing the generated model;
determining, for a given sliding window time slot of the runtime call pattern data, association rules between the captured point of interest events, a given one of the association rules characterizing a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot; and
controlling operation of the plurality of microservices in the information technology infrastructure based at least in part on the determined association rules;
wherein determining, for the given sliding window time slot of the runtime call pattern data, the association rules between the captured point of interest events comprises determining the given one of the association rules based at least in part on identifying at least a threshold difference between (i) actual frequencies of occurrence of the first and second point of interest events and (ii) expected frequencies of occurrence of the first and second point of interest events; and
wherein determining the association rules comprises:
computing a first support of the first point of interest event, the first support denoting the actual frequency of occurrence of the first point of interest event in the given sliding window time slot of the runtime call pattern data; and
computing a second support of the second point of interest event, the second support denoting the actual frequency of occurrence of the second point of interest event in the given sliding window timeslot of the runtime call pattern data.

15. The computer program product of claim 14 wherein determining the association rules comprises:
computing a confidence of an association between the first point of interest event and the second point of interest event, the confidence denoting an extent to which the association is verified to be true over the runtime call pattern data; and
computing a lift of the association between the first point of interest event and the second point of interest event, the lift denoting a ratio of the computed first support and the second support to expected support of the first point of interest event and the second point of interest event if the first point of interest event and the second point of interest event were independent.

16. The computer program product of claim 15 wherein the given association rule is created responsive to (i) determining that the computed confidence of the association between the first point of interest event and the second point of interest event exceeds a designated confidence threshold and (ii) determining that the computed lift of the association between the first point of interest event and the second point of interest event exceeds a designated lift threshold.

17. A method comprising:
obtaining runtime call pattern data for a plurality of microservices in an information technology infrastructure;
generating a model of the runtime call pattern data characterizing transitions between a plurality of states of the plurality of microservices;
capturing point of interest events from the runtime call pattern data utilizing the generated model;
determining, for a given sliding window time slot of the runtime call pattern data, association rules between the captured point of interest events, a given one of the association rules characterizing a relationship between a first point of interest event corresponding to a first state transition for a first one of the plurality of microservices occurring during the given sliding window time slot and at least a second point of interest event corresponding to a second state transition for a second one of the plurality of microservices occurring during the given sliding window time slot; and
controlling operation of the plurality of microservices in the information technology infrastructure based at least in part on the determined association rules;
wherein determining, for the given sliding window time slot of the runtime call pattern data, the association rules between the captured point of interest events comprises determining the given one of the association rules based at least in part on identifying at least a threshold difference between (i) actual frequencies of occurrence of the first and second point of interest events and (ii) expected frequencies of occurrence of the first and second point of interest events;

wherein determining the association rules comprises:

computing a first support of the first point of interest event, the first support denoting the actual frequency of occurrence of the first point of interest event in the given sliding window time slot of the runtime call pattern data; and computing a second support of the second point of interest event, the second support denoting the actual frequency of occurrence of the second point of interest event in the given sliding window timeslot of the runtime call pattern data; and wherein the method is performed by at least one processing device comprising a processor coupled to a memory.

18. The method of claim 17 wherein determining the association rules comprises:

computing a confidence of an association between the first point of interest event and the second point of interest event, the confidence denoting an extent to which the association is verified to be true over the runtime call pattern data; and computing a lift of the association between the first point of interest event and the second point of interest event, the lift denoting a ratio of the computed first support and the second support to expected support of the first point of interest event and the second point of interest event if the first point of interest event and the second point of interest event were independent.

19. The method of claim 18 wherein the given association rule is created responsive to (i) determining that the computed confidence of the association between the first point of interest event and the second point of interest event exceeds a designated confidence threshold and (ii) determining that the computed lift of the association between the first point of interest event and the second point of interest event exceeds a designated lift threshold.

20. The method of claim 17 wherein controlling operation of the plurality of microservices in the information technology infrastructure based at least in part on the determined association rules comprises identifying dependency patterns among the plurality of microservices utilizing a subset of the determined association rules.

\* \* \* \* \*